(12) United States Patent
Lee et al.

(10) Patent No.: US 12,409,745 B2
(45) Date of Patent: Sep. 9, 2025

(54) CHARGING SYSTEM FOR ELECTRIC VEHICLE WITH REDUCED NOISE DURING CHARGING

(71) Applicants: Hyundai Motor Company, Seoul (KR); Kia Corporation, Seoul (KR)

(72) Inventors: Myoung Seok Lee, Seoul (KR); Soung Han Noh, Yongin-si (KR); Tae Hee Jung, Suwon-si (KR); Jung Hwan Na, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 794 days.

(21) Appl. No.: 17/730,355

(22) Filed: Apr. 27, 2022

(65) Prior Publication Data

US 2023/0027941 A1    Jan. 26, 2023

(30) Foreign Application Priority Data

Jul. 22, 2021  (KR) .......................... 10-2021-0096612

(51) Int. Cl.
| | |
|---|---|
| *B60L 53/22* | (2019.01) |
| *B60L 53/16* | (2019.01) |
| *B60L 53/30* | (2019.01) |
| *B60L 53/62* | (2019.01) |
| *B60L 53/66* | (2019.01) |

(52) U.S. Cl.
CPC .............. *B60L 53/22* (2019.02); *B60L 53/16* (2019.02); *B60L 53/305* (2019.02); *B60L 53/62* (2019.02); *B60L 53/66* (2019.02)

(58) Field of Classification Search
CPC ...................................................... B60L 53/22
USPC ......................................................... 320/109
See application file for complete search history.

(56) References Cited

U.S. PATENT DOCUMENTS

| | | | | |
|---|---|---|---|---|
| 2010/0268406 | A1* | 10/2010 | Ito ......................... | B60L 3/0023 701/22 |
| 2012/0091824 | A1* | 4/2012 | Campolo ................ | B60L 53/16 307/135 |
| 2013/0320922 | A1* | 12/2013 | Acena ..................... | B60L 53/14 320/109 |
| 2015/0115873 | A1* | 4/2015 | Lee ......................... | B60L 53/14 320/107 |

(Continued)

FOREIGN PATENT DOCUMENTS

KR    20190010786 A    1/2019

*Primary Examiner* — Jerry D Robbins
(74) *Attorney, Agent, or Firm* — Slater Matsil, LLP

(57) ABSTRACT

A charging system for an electric vehicle that receives electric power from external charging equipment to charge a battery includes an inlet including a plurality of ports. The inlet is connectable to the external charging equipment. A charging management part includes a control pilot (CP) terminal for receiving a charging signal indicating information related to a charging power source of the external charging equipment through the inlet. The CP terminal includes a CP plus terminal connected to a CP port among the plurality of ports of the inlet. The CP plus terminal is configured to receive the charging signal. A CP minus terminal is directly connected to a ground port among the plurality of ports of the inlet. The CP minus terminal is configured to receive a ground potential of the external charging equipment.

20 Claims, 7 Drawing Sheets

(56) References Cited

U.S. PATENT DOCUMENTS

| | | | |
|---|---|---|---|
| 2015/0175020 A1* | 6/2015 | Kim | B60L 58/12 |
| | | | 320/109 |
| 2017/0129348 A1* | 5/2017 | Jang | B60L 53/11 |
| 2018/0334047 A1* | 11/2018 | Wischnack | B60L 53/66 |
| 2019/0023136 A1 | 1/2019 | Lee et al. | |
| 2019/0160955 A1* | 5/2019 | Yang | B60L 53/60 |
| 2021/0305833 A1* | 9/2021 | Marcos Pastor | H02J 7/007182 |

* cited by examiner

[FIG. 1]
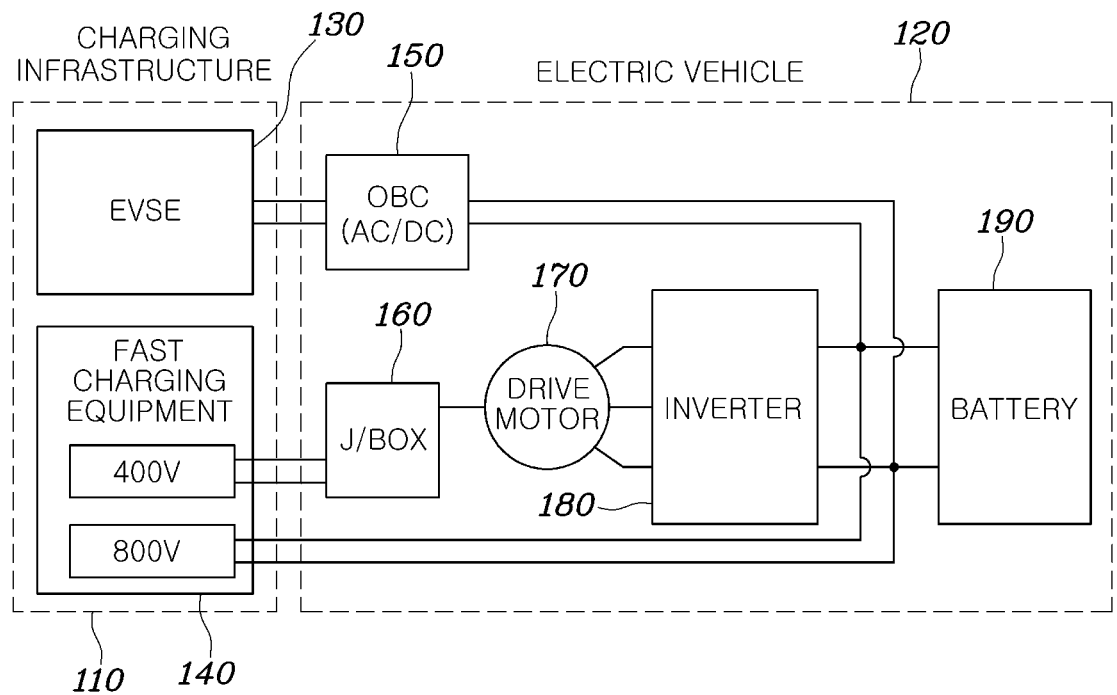
[FIG. 2]
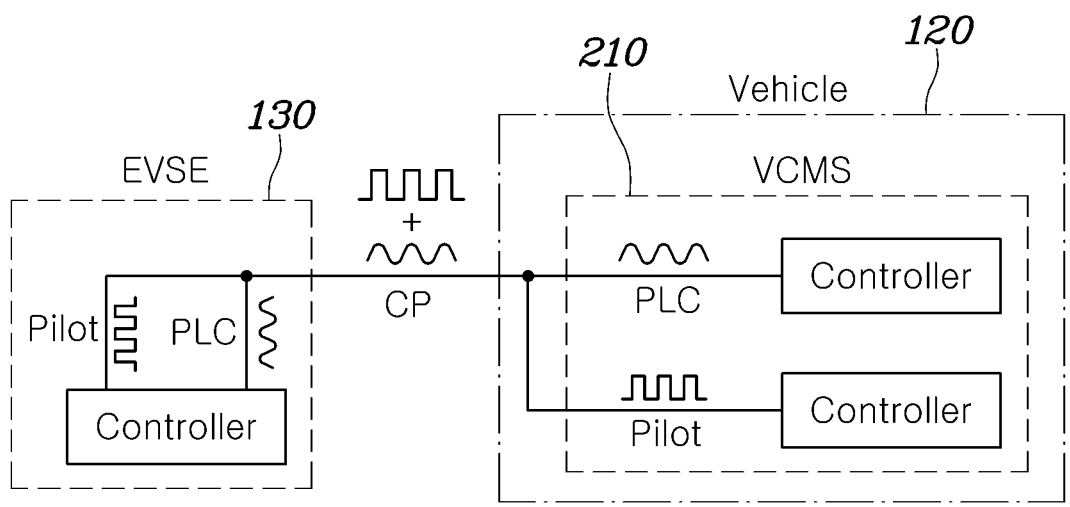

[FIG. 3]
-PRIOR ART-
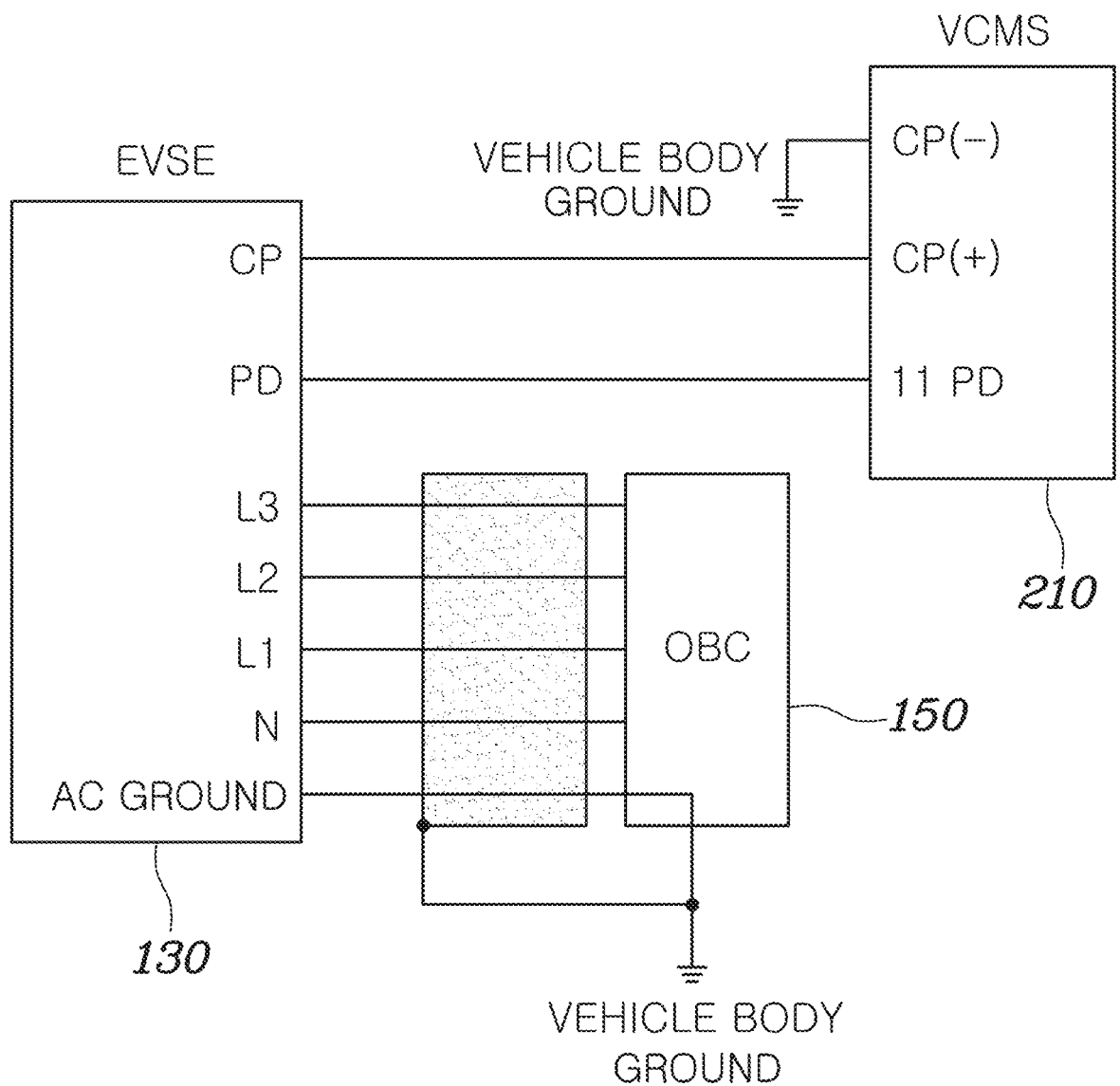

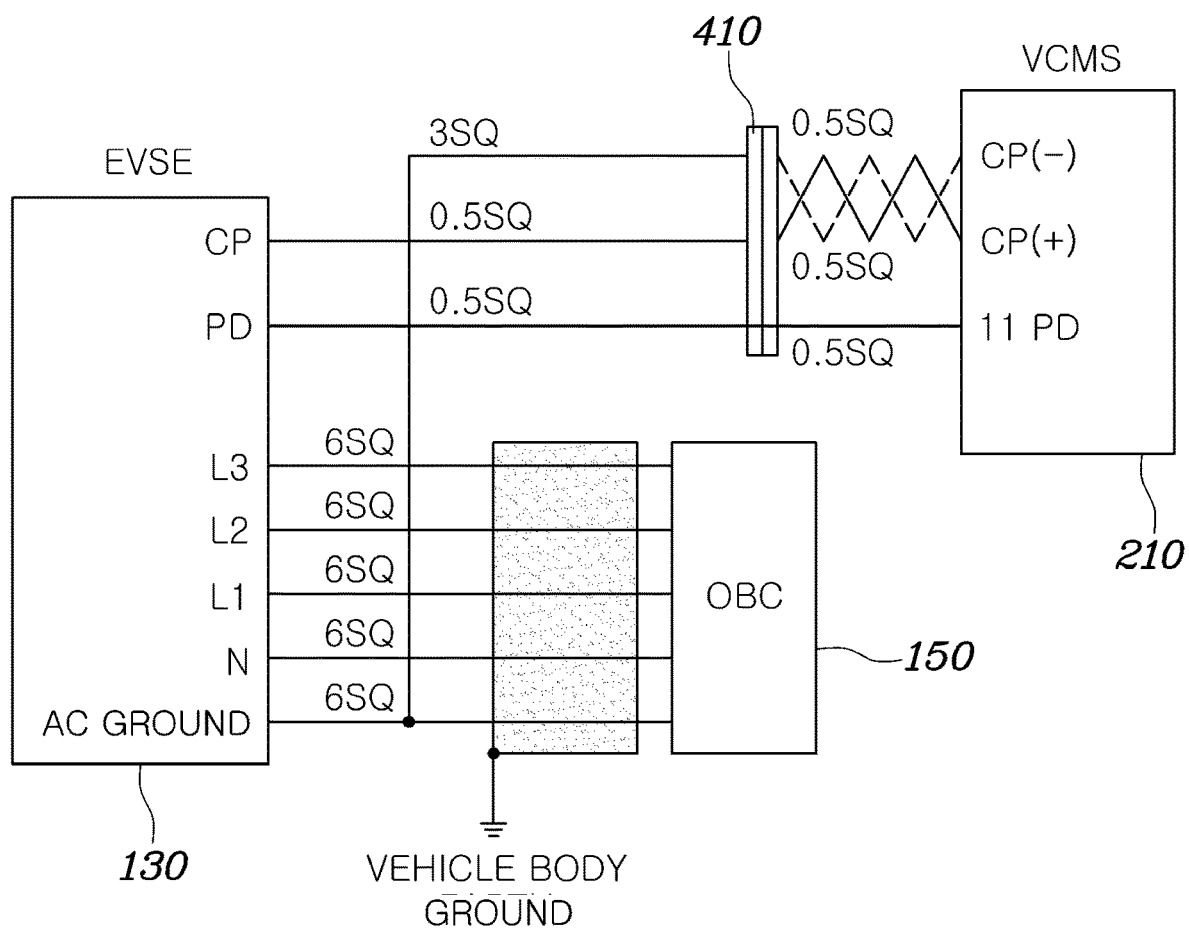
[FIG. 4]

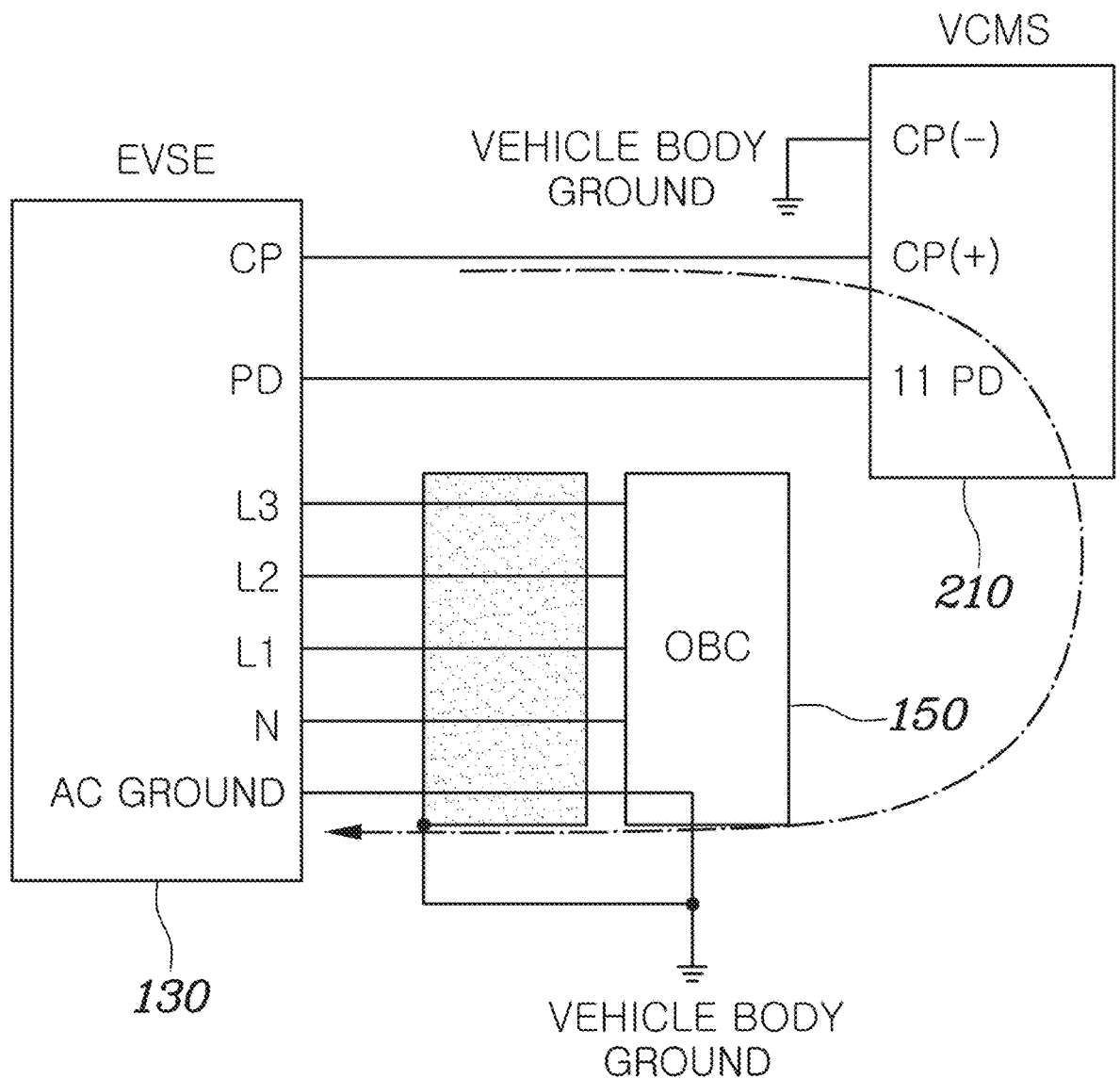
[FIG. 5A]
-PRIOR ART-

[FIG. 5B]
-PRIOR ART-
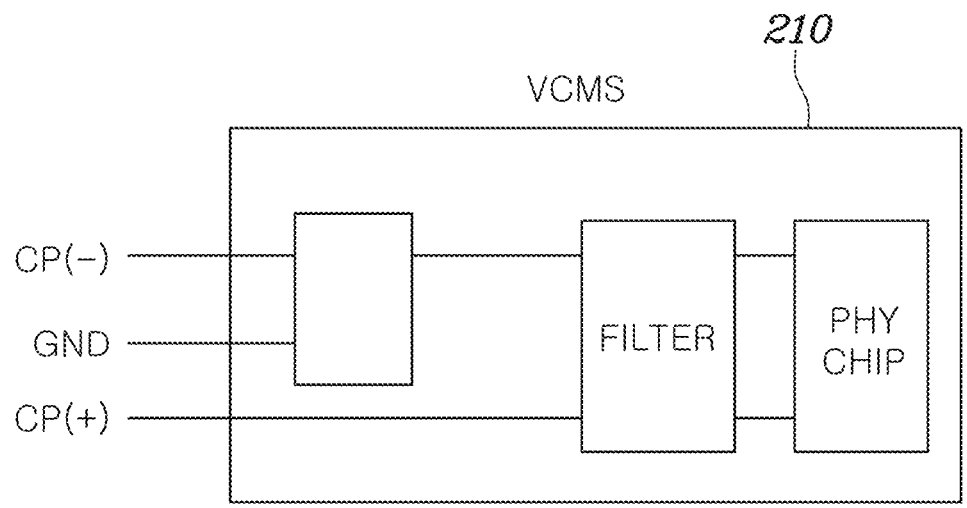

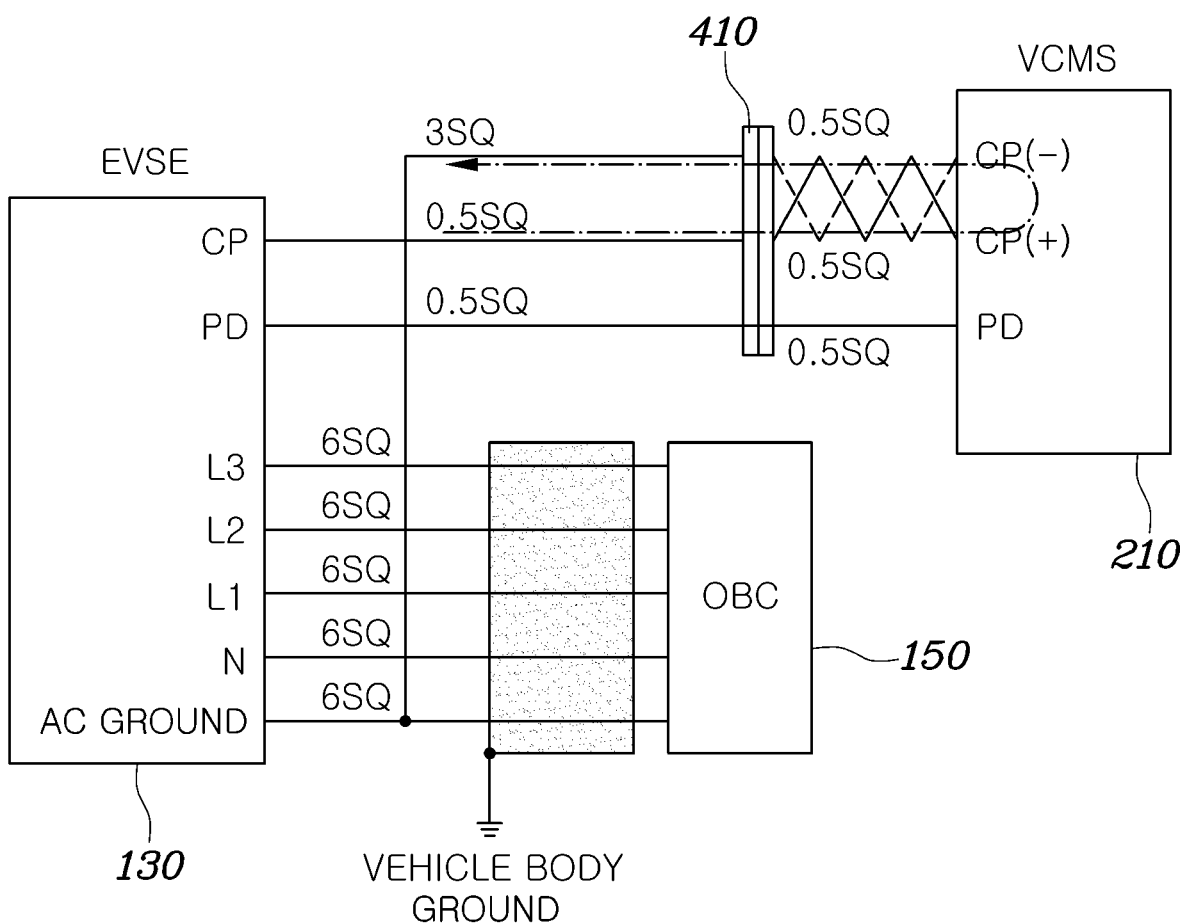
[FIG. 6A]

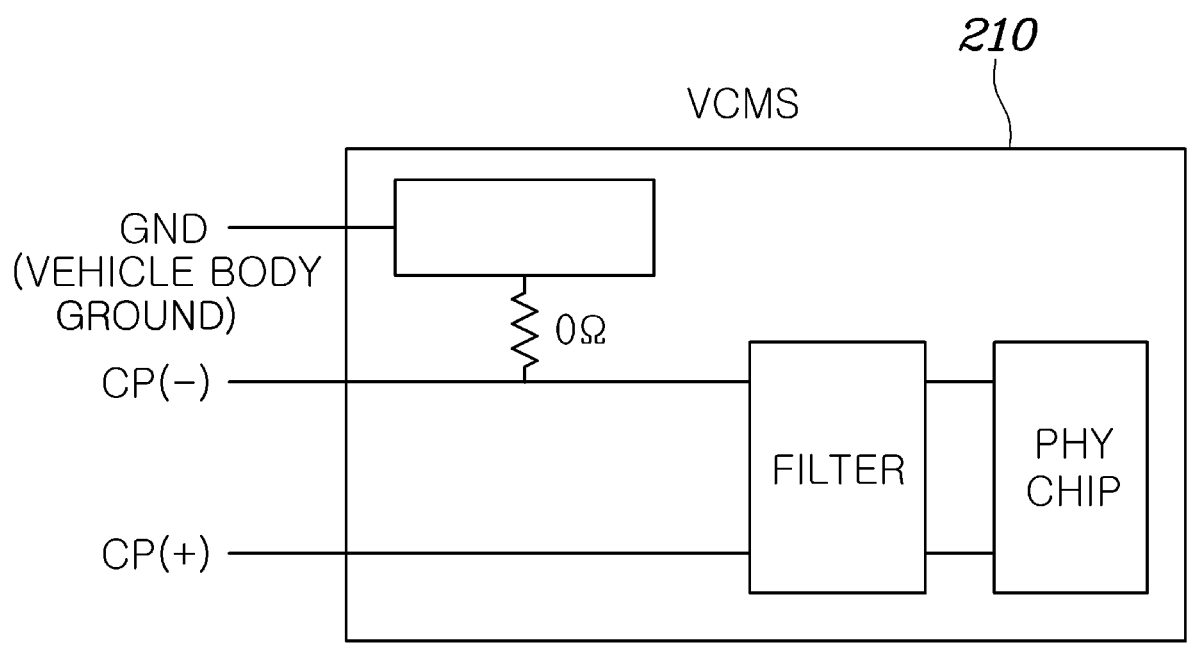
[FIG. 6B]

CHARGING SYSTEM FOR ELECTRIC VEHICLE WITH REDUCED NOISE DURING CHARGING

CROSS-REFERENCE TO RELATED APPLICATIONS

This application claims the benefit of Korean Patent Application No. 10-2021-0096612, filed on Jul. 22, 2021, which application is hereby incorporated herein by reference.

TECHNICAL FIELD

The present disclosure relates to a charging system for an electric vehicle.

BACKGROUND

Unlike internal combustion engine vehicles that use fossil fuels as their main energy source, electric vehicles use electric energy as their main energy source. Therefore, a high-voltage battery capable of storing electric energy, a motor as a power source, and an inverter for driving the motor are essential for the electric vehicle. In order to increase a travel distance and power consumption efficiency of the electric vehicle, a capacity of a battery is on the rise. In addition, efforts are actively being made to increase efficiencies of the inverter and the motor.

One method of improving the efficiencies of the inverter and the motor is a method of increasing a battery voltage. For example, when the battery voltage is increased twice, since P=VI is satisfied, a current flowing in the inverter and the motor at the same output power is reduced to ½ and a conduction loss ($I^2R$) is reduced to ¼. Therefore, efficiencies of the inverter and the motor are increased by as much as a decrease of the conduction loss. When a power element and a conductor, each having a large conduction resistance are used, not only a size of each of the inverter and the motor but also a size of a connecting connector between the battery-inverter-motor can be reduced so that it is advantageous for cost reduction.

However, there is a limitation in increasing the battery voltage. Most of the fast chargers currently installed on the market can charge batteries at only a voltage ranging from about 200 V to 500 V. Therefore, even when the battery voltage is raised to 800 V or more for high efficiency, the batteries cannot be charged using the existing fast chargers capable of charging the batteries at only the voltage ranging from 200 V to 500 V. Such a compatibility problem with commercial rapid chargers is a limiting factor in increasing the battery voltage of the electric vehicle. That is, in order to increase the battery voltage of the electric vehicle, there is a problem in that a high-voltage charger capable of outputting a high voltage (=charging) needs to be separately developed and additionally installed in the market.

Meanwhile, there is a method of boosting a voltage using a separate direct current/direct current (DC/DC) converter and charging a high-voltage battery using the existing fast charger. However, a large-capacity converter for voltage boosting in a large range has a very large weight and a very large volume and is expensive, and thus it is difficult to be provided in a vehicle and may cause an increase in the price of the vehicle.

In order to solve problems in the art, a multi-input charging method using a voltage boosting manner employing an inverter instead of the separate DC/DC converter has been proposed.

The foregoing is intended merely to aid in understanding of the background of the present disclosure, and is not intended to mean that the present disclosure falls within the purview of the related art that is already known to those skilled in the art.

SUMMARY

The present disclosure relates to a charging system for an electric vehicle (EV). Particular embodiments relate to a charging system for an EV capable of improving charging performance of the EV by reducing a noise which may occur during multi-charging of the EV.

Accordingly, embodiments of the present disclosure have been made keeping in mind problems occurring in the related art, and embodiments of the present disclosure provide a charging system for an electric vehicle (EV) of which a battery is charged using power line communication (PLC), in which the PLC is less affected by a switching noise of an inverter in the EV, and thus robustness of a PLC signal is increased by directly connecting a minus terminal of a control pilot (CP) line, through which the PLC is performed, to a ground of external charging equipment for charging the EV to allow the minus terminal of the CP line to not pass through a vehicle body ground.

Embodiments of the present disclosure are not limited to the technical problems as described above, and other technical problems can be derived from the following description.

According to one embodiment, there is provided a charging system for an electric vehicle, which includes an inlet which includes a plurality of ports and is connected to the external charging equipment, and a charging management part including a control pilot (CP) terminal configured to receive a charging signal indicating information related to a charging power source of the external charging equipment through the inlet, wherein the CP terminal includes a CP plus terminal connected to a CP port among a plurality of ports of the inlet and configured to receive the charging signal and a CP minus terminal directly connected to a ground port among the plurality of ports of the inlet and configured to receive a ground signal of the external charging equipment.

The information related to the charging power source may be information on whether charging of the EV is started with either fast charging or slow charging.

The charging signal may be received by the CP terminal through power line communication (PLC).

The external charging equipment may be a charger configured to supply a voltage of 400 V.

The battery may be an 800 V high-voltage battery.

The voltage of 400 V from the external charging equipment may be boosted to a voltage of 800 V by an inverter inside the EV and supplied to the battery.

The CP minus terminal may be connected to a vehicle body ground terminal of the charge management part through a resistor of zero ohms.

The charging system may further include an intermediate connector configured to connect the CP port and a ground port of the inlet to the CP plus terminal and the CP minus terminal of the charging management part, respectively.

The ground port of the inlet and the intermediate connector may be connected through a conductive line of a second line diameter branching off from a conductive line of a first line diameter of the ground port of the inlet, the intermediate connector and the CP minus terminal of the charge management part may be connected through a conductive line of a third line diameter, the first line diameter may be greater than the second line diameter, and the second line diameter may be greater than the third line diameter.

The first line diameter may be 6 SQ, the second line diameter may be 3 SQ, and the third line diameter may be 0.5 SQ.

The conductive lines connected from the CP port and the ground port of the inlet to the intermediate connector may be twisted to each other and connected to the CP plus terminal and the CP minus terminal of the charge management part.

BRIEF DESCRIPTION OF THE DRAWINGS

The above and other objects, features and other advantages of embodiments of the present disclosure will be more clearly understood from the following detailed description when taken in conjunction with the accompanying drawings, in which:

FIG. 1 is a schematic block diagram illustrating multi-input charging to aid understanding of embodiments of the present disclosure;

FIG. 2 is a schematic diagram illustrating a state in which a pilot signal and a power line communication (PLC) signal are transmitted through a control pilot (CP) line;

FIG. 3 is a diagram illustrating a path design of a conventional CP line of a vehicle;

FIG. 4 is a diagram illustrating a charging system for an electric vehicle according to an embodiment of the present disclosure;

FIGS. 5A and 5B are diagrams illustrating a charging system for an electric vehicle according to the related art; and FIGS. 6A and 6B are diagrams illustrating a charging system for an electric vehicle according to an embodiment of the present disclosure.

DETAILED DESCRIPTION OF ILLUSTRATIVE EMBODIMENTS

Hereinafter, exemplary embodiments of the present disclosure will be described in detail with reference to the accompanying drawings.

The present disclosure relates to a charging system for an electric vehicle, which charges a battery using power line communication (PLC), and may be briefly referred to as a "charging system" hereinafter.

FIG. 1 is a schematic block diagram illustrating multi-input charging to aid understanding of embodiments of the present disclosure. Referring to FIG. 1, the multi-input charging of a vehicle is largely performed by a charging infrastructure 110 and an electric vehicle (EV) 120.

The charging infrastructure 110 may include at least one of an electric vehicle supply equipment (EVSE) 130 and a fast charging equipment 140, and the EV 120 may include an on-board charger (OBC) 150, a J/BOX 160, a drive motor 170, an inverter 180, and a battery 190.

A plug-in hybrid vehicle (PHEV) and an EV are charged with electricity from an external power source and are driven using the electricity as a power source. The vehicle receives electricity from the EVSE 130 to charge the battery 190, and a charging method is broadly divided into a slow charging method and a fast charging method.

A slow charging method converts an alternating current (AC) of a charger into a direct current (DC) thereof to charge the battery 190, and the OBC 150 of the vehicle converts the AC into the DC.

The fast charging method performs charging by directly connecting the DC of the charger to the high voltage battery 190 of the EV.

Recently, as the industrial demand for improving a charging speed of EVs increases, various attempts are being made to increase charging power, and one among the various attempts is a method of increasing a voltage of a high-voltage battery of the EVs. As an example of a battery with an increased voltage, an 800 V battery may be considered.

The existing EV is equipped with a 400 V high-voltage battery, and a fast charger also supplies 400 V to charge the 400 V high-voltage battery. However, in order to charge an EV equipped with an 800 V battery using the existing charger supplying 400 V, a process of boosting a voltage is required. In order to boost the voltage, a multi-input charging method is employed, in which a voltage of a charger is boosted by controlling a plurality of switching elements in an inverter, and then a battery is charged using the voltage boosted by the inverter.

Meanwhile, in order to charge the battery 190 with electricity from an external charger, the EV 120 is connected to a power line, a control pilot (CP) line, and a proximity detection (PD) line. The CP line is a passage for exchanging vehicle information with the EVSE 130 and connects a control board of the EVSE 130 to a vehicle charge management system (VCMS) 210 of the EV 120. The CP line transmits information from the EVSE 130 to a vehicle controller by overlapping a pilot signal with a PLC signal.

The PLC signal used in a charger of an EV is broadband power line communication ranging from 1.8 MHz to 30 MHz and is referred to as high-frequency power line communication. During fast charging, the CP line receives and transmits signals with respect to the fast charging and transmits and receives information between the EVSE 130 and the EV 120 using the PLC communication with respect to the fast charging of 400 V and 800 V. FIG. 2 is a schematic diagram illustrating a state in which a pilot signal and the PLC signal are transmitted through the CP line.

The pilot signal is transmitted from the EVSE 130 to the VCMS 210 in the form of a pulse width modulation (PWM) of 1 kHz. The pilot signal is differently transmitted according to statuses of the EVSE 130 and the EV 120. During slow charging, information on the slow charging is transmitted and received between the EVSE 130 and the EV 120 through the pilot signal.

The PLC signal is broadband power line communication ranging from 1.8 MHz to 30 MHz and is referred to as high-frequency power line communication. During the fast charging through the PLC signal, information on the fast charging is transmitted and received between the EVSE 130 and the EV 120.

Since the pilot signal has a frequency range of 1 KHz and the PLC signal has a frequency range of several MHz, the used frequency ranges are different from each other. Thus, the pilot signal and the PLC signal overlap in the CP line to be transmitted, and then the VCMS 210 separates the pilot signal from the PLC signal again through a filter.

As described above, the PLC performed through the CP line requires a CP plus line and a CP minus line, and FIG. 3 is a diagram illustrating a path design of a conventional CP line of a vehicle.

Referring to FIG. 3, the conventional CP line is designed such that a CP plus terminal of the VCMS 210 is connected to a CP port of the EVSE 130, and a CP minus terminal of the VCMS 210 is connected to the vehicle body ground. When the EV 120 is not connected to the EVSE 130, the vehicle body ground to which the CP minus terminal is connected is not connected to the ground of the EVSE 130, and while the EV 120 is charged, the vehicle body ground passes through the OBC 150 of the EV 120 (i.e., through the vehicle body ground) to be grounded to a ground of the EVSE 130.

Meanwhile, during multi-input charging in which switching operations of a plurality of switches in the inverter 180 are controlled and a voltage of the EVSE 130 is boosted to charge the battery 190 of the EV 120, a switching noise is generated due to the switching operation of the inverter 180. When the switching noise of the inverter 180 affects the vehicle body ground, a waveform of the PLC using the CP line is distorted to overlap so that distinction of PLC channels may become ambiguous to cause an interruption of the charging.

Embodiments of the present disclosure can solve the above problem according to the related art and provide a robust CP line capable of being less affected by an inverter noise so that the PLC is not interrupted during multi-input charging (that is, while the inverter performs a switching operation). Hereinafter, the VCMS 210 of the EV may be interchangeably used with a charging management part 210.

FIG. 4 is a diagram illustrating a charging system for an electric vehicle according to an embodiment of the present disclosure.

The charging system for an electric vehicle according to an embodiment of the present disclosure may include an EVSE 130, a VCMS 210, and an OBC 150.

The EVSE 130 is connected to an EV 120 by connecting a charging connector provided in a charger to an inlet of the EV 120. In other words, electric power and various signals from the EVSE 130 are input to the EV 120 through the inlet provided in the EV 120. For example, a CP signal generated from the EVSE 130 may be transmitted to a CP terminal of the VCMS 210 of the EV through a fourth port of the inlet for transmission of the CP signal.

As described above, various signals and power of the EVSE 130 are transmitted to the VCMS 210 of the EV 120 through a port of the corresponding inlet. Although the drawings of the present specification show a connection between the EVSE 130 and the VCMS 210, it will be easily understood by those skilled in the art that this connection is not different from a connection between the VCMS 210 and each port of the inlet corresponding to the signal and the power of the EVSE 130.

For example, a CP port of the EVSE 130 of FIG. 4 being illustrated as being connected to a CP plus terminal of the VCMS 210 means that the CP signal of the EVSE 130 is transmitted to the CP plus terminal of the VCMS 210. This can be understood that the CP port of the inlet is connected to the CP plus terminal of the VCMS 210 to transmit a CP signal from the EVSE 130 to the CP plus terminal of the VCMS 210.

Hereinafter, for convenience of description, a connection relationship between each port of the inlet and each terminal of the VCMS 210 will be described.

The inlet has a plurality of ports, and each port is connected to a corresponding terminal according to its function (or a signal to be transmitted).

The CP port may be a port for transmitting and receiving a PLC signal and a PWM signal between the EV and the charger. Here, the charger transmits the PWM signal to the EV through the CP line and may inform the EV whether a fast charging process or a slow charging process is started through a duty cycle control of the PWM signal.

When the EV discriminates a duty cycle of the received PWM signal and thus a charging mode is confirmed, the EV may perform a charging process according to the confirmed charging mode together with the charger through the PLC.

For example, when the duty cycle of the PWM signal is 5%, the EV may start the fast charging process, and when the duty cycle is 20%, the EV may start the slow charging process, and when the duty cycle is 100%, the EV may recognize that charging is terminated. However, the example of the duty cycle is merely one embodiment, and it should be noted that values of the duty cycle corresponding to the fast charging mode and the slow charging mode may be different according to designs of those skilled in the art.

An N port and L1, L2, and L3 ports may be used as ports for power transmission in the slow charging mode.

An AC GROUND port may be used to supply a ground signal to a PLC controller of the EV and the OBC 150.

A PD port is for detecting an approach of the charging connector to the inlet of the EV.

A DC plus port and a DC minus port are ports for the fast charging and may be directly connected to the battery of the EV.

Referring to FIG. 4, the CP port and the PD port of the inlet are connected to the VCMS 210 of the EV, the L1, L2, L3 and N ports are connected to the OBC 150 of the EV, and the ground port (AC GROUND) is connected to the OBC 150 and the VCMS 210.

The VCMS 210 may receive the CP signal from the EVSE 130 through the CP plus terminal connected to the CP port of the inlet and acquire information related to the charging power source of the external charging equipment. In this case, the transmission and reception of the signal may be performed through the PLC.

In one embodiment of the present disclosure, the information related to the charging power source may be information on whether the charging of the EV is started with either the fast charging or the slow charging.

The CP minus terminal of the VCMS 210 is directly connected to the ground port of the inlet. This means that a ground signal of the external charging equipment may be directly received without passing through the OBC 150 inside the EV.

FIGS. 5A and 5B are diagrams illustrating a charging system for an electric vehicle according to the related art, and FIGS. 6A and 6B are diagrams illustrating the charging system for an electric vehicle according to an embodiment of the present disclosure.

Referring to FIG. 5A, in the charging system for an electric vehicle according to the related art, when the EV is connected to the EVSE 130 through the inlet, the CP minus terminal of the VCMS 210 is connected to the ground of the EVSE 130 through the vehicle body ground of the OBC 150. According to such a conventional CP line connection, an area of a loop (shown as an arrow in FIG. 5A) formed by the CP plus terminal and the CP minus terminal is very large so that self-inductance due to the loop is generated largely. Therefore, the PLC communication signal using a frequency range of several MHz cannot be transmitted smoothly.

In addition, when the vehicle body ground is affected due to a switching noise caused by a switching of an inductor for the multi-input charging, there is a problem in that the CP minus terminal connected to the vehicle body ground is affected, and thus distortion occurs in the PLC.

FIG. 5B is a diagram illustrating a printed circuit board (PCB) pattern of the charging system for an electric vehicle according to the related art, and it can be seen that the CP minus terminal is connected to a vehicle body ground GND.

Referring to FIG. 6A, in the charging system for an electric vehicle according to an embodiment of the present disclosure, the CP minus terminal of the VCMS 210 is directly connected to the ground terminal of the inlet. In other words, the CP minus terminal of the VCMS 210 directly receives a ground signal of the EVSE 130.

The CP minus terminal being directly connected to the ground terminal of the inlet means that the CP minus terminal directly receives the ground signal of the EVSE 130 without passing through the OBC 150 (i.e., without passing through the vehicle body ground). As described above, since the CP minus terminal directly receives the ground signal of the EVSE 130, a path of the loop formed by the CP plus terminal and the CP minus terminal becomes very small. When an area of the loop is reduced because the path of the loop is small, the self-inductance due to the loop is reduced so that the signal is smoothly transmitted from the CP minus terminal to the ground port in the PLC using the frequency range of several MHz.

In addition, since impedance of the ground port is very low, even when the vehicle body ground is affected by the switching noise of the inverter, the CP minus terminal is connected through the ground port without passing through the vehicle body ground. Consequently, the CP line formed by the CP plus terminal and the CP minus terminal is less affected by the switching noise caused by the switching of the inverter, and thus signal robustness of the PLC is increased.

FIG. 6B is a diagram illustrating a PCB pattern of the charging system for an electric vehicle according to an embodiment of the present disclosure. The signal received by the CP minus terminal is designed to be directly transmitted to a physical communication signal processor for the PLC.

Meanwhile, in one embodiment of the present disclosure, the CP minus terminal may be designed to be connected through a GND terminal and a resistor of zero ohms in order to match a GND potential of the VCMS 210.

In one embodiment of the present disclosure, the CP port and the ground port of the inlet may be connected to the CP plus terminal and the CP minus terminal of the VCMS 210, respectively, through an intermediate connector 410. More specifically, the CP port of the inlet is connected to the CP plus terminal of the VCMS 210 through the intermediate connector 410, the PD port of the inlet is connected to the PD terminal of the VCMS 210 through the intermediate connector 410, and the AC GROUND port of the inlet is connected to the CP minus terminal of the VCMS 210 through the intermediate connector 410.

Meanwhile, conductive lines connecting the plurality of ports of the inlet to the terminals of the VCMS 210 have different line diameters according to flowing currents and their functions. For example, a line through which a high current of several hundred amperes flows is connected by a conductive line having a thick line diameter. Contrarily, when a thickness of the conductive line is increased, self-inductance increases, and thus the PLC signal of several MHz cannot be transmitted smoothly so that the CP line which is a high-frequency communication signal line is connected by a conductive line having a thin line diameter.

In the charging system for an electric vehicle according to the embodiment of the present disclosure, the ground port of the inlet and the intermediate connector 410 are connected through a conductive line of a second line diameter branching off from a conductive line of a first line diameter of the ground port of the inlet, and the intermediate connector 410 and the CP minus terminal of the VCMS 210 are connected through a conductive line of a third line diameter. The first line diameter may be greater than the second line diameter, and the second line diameter may be greater than the third line diameter.

In one embodiment of the present disclosure, the ground port of the inlet and the intermediate connector 410 may be connected through a conductive line of a 3 SQ line diameter branching off from a conductive line of a 6 SQ line diameter, which connects the ground port of the inlet to the OBC 150, and the intermediate connector 410 and the CP plus terminal may be connected through a conductive line of a 0.5 SQ line diameter.

This is because direct branching off the thick conductive line (6 SQ) of the high voltage line into the thin conductive line (0.5 SQ) may cause a disconnection problem in a structure so that the line diameter of the conductive line is gradually reduced through the intermediate connector 410.

In one embodiment of the present disclosure, the conductive lines, which are connected from the CP port of the inlet and the ground port thereof to the CP plus terminal and the CP minus terminal of the VCMS 210 through the intermediate connector 410, respectively, may pass through the intermediate connector 410 and then may be twisted together to be connected to the CP plus terminal and the CP minus terminal.

As described above, when the conductive lines are twisted and connected to the CP plus terminal and the CP minus terminal, even when a noise occurs during signal transmission, the two twisted conductive lines affect each other and a noise is generated in both of the conductive lines. Considering that information is processed using a difference between signals input to both terminals, the noise being input to both the CP plus terminal and the CP minus terminal due to the twist of the conductive lines may help to increase reliability of signal processing more than a noise being input to only one terminal.

According to the charging system for an electric vehicle according to an embodiment of the present disclosure, the CP minus terminal of the VCMS 210 used for the PLC is directly connected to the ground terminal of the inlet to directly receive the ground signal of the EVSE 130. As described above, since the CP minus terminal directly receives the ground signal of the EVSE 130 without passing through the vehicle body ground, the path of the loop formed by the CP plus terminal and the CP minus terminal of the CP line through which the PLC is performed becomes very small so that there is a technical effect in that the signals are smoothly transmitted from the CP minus terminal to the ground port.

In addition, since impedance of the ground port is very low, even when the vehicle body ground is affected by the switching noise of the inverter, the CP minus terminal is connected through the ground port without passing through the vehicle body ground. Thus, the CP line formed by the CP plus terminal and the CP minus terminal is less affected by the switching noise caused by the switching of the inverter, and thus signal robustness of the PLC is increased so that the charging may be efficiently performed.

In accordance with embodiments of the present disclosure, a charging system for an electric vehicle (EV) of which a battery is charged using power line communication (PLC), affects the PLC less by a switching noise of an inverter in the EV, and thus robustness of a PLC signal is increased by directly connecting a minus terminal of a control pilot (CP) line, through which the PLC is performed, to a ground of external charging equipment for charging the EV to allow the minus terminal of the CP line to not pass through a vehicle body ground so that there is an effect of increasing efficiency of multi-input charging.

The exemplary embodiments of the present disclosure have been described. It can be understood by those skilled in the art to which the present disclosure pertains that the present disclosure can be implemented in modified forms without departing from the essential features of the present disclosure. Therefore, the disclosed embodiments should be considered as an illustrative rather than a determinative. The scope of the present disclosure is defined by the appended claims rather than by the foregoing description, and all differences within the scope of equivalents thereof should be construed as being included in the present disclosure.

What is claimed is:

1. A charging system for an electric vehicle (EV) configured to receive electric power from external charging equipment to charge a battery, the charging system comprising:
   an inlet comprising a plurality of ports, wherein the inlet is configured to be connected to the external charging equipment; and
   a charging management part comprising a control pilot (CP) terminal configured to receive a charging signal indicating information related to a charging power source of the external charging equipment through the inlet, wherein the CP terminal comprises:
      a CP plus terminal connected to a CP port among the plurality of ports of the inlet, wherein the CP plus terminal is configured to receive the charging signal; and
      a CP minus terminal directly connected to a ground port among the plurality of ports of the inlet, wherein the CP minus terminal is configured to receive a ground potential of the external charging equipment.

2. The charging system of claim 1, wherein the information related to the charging power source comprises information on whether charging of the EV is started with either fast charging or slow charging.

3. The charging system of claim 1, wherein the CP terminal is configured to receive the charging signal through power line communication.

4. The charging system of claim 1, further comprising an inverter inside the EV, the inverter configured to boost a voltage from the external charging equipment and to provide the boosted voltage to the charging management part.

5. The charging system of claim 4, wherein:
   the external charging equipment comprises a charger configured to supply a voltage of 400 V;
   the battery comprises an 800 V high-voltage battery; and
   the inverter is configured to boost the voltage of 400 V from the external charging equipment to a voltage of 800 V.

6. The charging system of claim 1, wherein the CP minus terminal is connected to a vehicle body ground terminal of the charging management part.

7. A charging system for an electric vehicle (EV) configured to receive electric power from external charging equipment to charge a battery, the charging system comprising:
   an inlet comprising a plurality of ports, wherein the inlet is configured to be connected to the external charging equipment;
   a charging management part comprising a control pilot (CP) terminal configured to receive a charging signal indicating information related to a charging power source of the external charging equipment through the inlet, wherein the CP terminal comprises:
      a CP plus terminal connected to a CP port among the plurality of ports of the inlet, wherein the CP plus terminal is configured to receive the charging signal; and
      a CP minus terminal directly connected to a ground port among the plurality of ports of the inlet, wherein the CP minus terminal is configured to receive a ground potential of the external charging equipment; and
   an intermediate connector configured to connect the CP port and a ground port of the inlet to the CP plus terminal and the CP minus terminal of the charging management part, respectively.

8. The charging system of claim 7, wherein:
   the ground port of the inlet and the intermediate connector are connected through a conductive line of a second line diameter branching off from a conductive line of a first line diameter of the ground port of the inlet;
   the intermediate connector and the CP minus terminal of the charging management part are connected through a conductive line of a third line diameter; and
   the first line diameter is greater than the second line diameter, and the second line diameter is greater than the third line diameter.

9. The charging system of claim 8, wherein the first line diameter is 6 SQ, the second line diameter is 3 SQ, and the third line diameter is 0.5 SQ.

10. The charging system of claim 7, wherein conductive lines connected from the CP port and the ground port of the inlet to the intermediate connector are twisted to each other and connected to the CP plus terminal and the CP minus terminal of the charging management part.

11. The charging system of claim 7, wherein the information related to the charging power source comprises information on whether charging of the EV is started with either fast charging or slow charging.

12. The charging system of claim 7, wherein the CP terminal is configured to receive the charging signal through power line communication.

13. The charging system of claim 7, further comprising an inverter inside the EV, the inverter configured to boost a voltage from the external charging equipment and to provide the boosted voltage to the charging management part.

14. The charging system of claim 7, wherein the CP minus terminal is connected to a vehicle body ground terminal of the charging management part through a resistor of zero ohms.

15. A method of charging a battery of an electric vehicle (EV) using a charging system that comprises an inlet comprising a plurality of ports and a charging management part comprising a control pilot (CP) terminal, the method comprising:
   connecting the inlet to an external charging equipment;
   receiving a charging signal at the CP terminal, the charging signal indicating information related to a charging power source of the external charging equipment connected to the inlet;
   connecting a CP plus terminal of the CP terminal to a CP port among the plurality of ports of the inlet, wherein the CP plus terminal receives the charging signal; and
   directly connecting a CP minus terminal of the CP terminal to a ground port among the plurality of ports of the inlet so that the CP minus terminal is connected to a ground potential of the external charging equipment; and
   receiving electric power from external charging equipment, the power being received across the CP plus terminal and the CP minus terminal.

16. The method of claim 15, wherein the information related to the charging power source comprises information on whether charging of the EV is started with either fast charging or slow charging.

17. The method of claim 15, wherein the CP terminal receives the charging signal through power line communication.

18. The method of claim 15, further using an inverter inside the EV to boost a voltage from the external charging equipment, power to the battery being supplied from the inverter.

19. The method of claim 18, wherein the external charging equipment comprises a charger that supplies a voltage of 400 V and the battery comprises an 800 V high-voltage battery and wherein boosting the voltage comprises boosting the voltage of 400 V from the external charging equipment to a voltage of 800 V using the inverter inside the EV.

20. The method of claim 15, wherein the CP minus terminal is connected to a vehicle body ground terminal of the charging management part.

\* \* \* \* \*